United States Patent [19]

Kumagai et al.

[11] Patent Number: 4,706,108
[45] Date of Patent: Nov. 10, 1987

[54] AUTOMATIC SETUP SYSTEM FOR CONTROLLING COLOR GAIN, HUE AND WHITE BALANCE OF TV MONITOR

[75] Inventors: Toru Kumagai, Tokyo; Yoshihiro Kosugi, Kanagawa, both of Japan

[73] Assignee: Sony Corporation, Tokyo, Japan

[21] Appl. No.: 849,528

[22] Filed: Apr. 8, 1986

[30] Foreign Application Priority Data

Apr. 12, 1985 [JP] Japan .................................. 60-77956
Apr. 12, 1985 [JP] Japan .................................. 60-77957

[51] Int. Cl.$^4$ ............................................ H04N 17/04
[52] U.S. Cl. ....................................... 358/10; 358/27; 358/28; 358/29
[58] Field of Search .................... 358/21 R, 27, 28, 29, 358/10

[56] References Cited

U.S. PATENT DOCUMENTS

| | | | |
|---|---|---|---|
| 3,573,352 | 4/1971 | Fujita | 358/29 |
| 3,962,722 | 6/1976 | Ciciora | 358/10 |
| 4,123,775 | 10/1978 | Bugni | 358/29 |
| 4,152,721 | 5/1979 | Kim | 358/27 |
| 4,207,589 | 6/1980 | Kawasaki | 358/28 |
| 4,340,904 | 7/1982 | Wingrove | 358/10 |
| 4,379,292 | 4/1983 | Minato et al. | 340/703 |

FOREIGN PATENT DOCUMENTS

63919 6/1978 Japan .................................. 358/29

Primary Examiner—John W. Shepperd
Attorney, Agent, or Firm—Lewis H. Eslinger; Alvin Sinderbrand

[57] ABSTRACT

A television monitor control apparatus has a signal processor supplied with a standard television signal, a color cathode ray tube supplied with a processed color signal obtained from the signal processor, a reference signal memory for storing at least a set of reference signals and a signal control circuit connected to the signal processor and the reference signal memory for adjusting the operation of the signal processor on the basis of the standard television signal and a reference signal from the memory.

3 Claims, 11 Drawing Figures

AUTOMATIC SETUP SYSTEM FOR CONTROLLING COLOR GAIN, HUE AND WHITE BALANCE OF TV MONITOR

BACKGROUND OF THE INVENTION

1. Field of the Invention

This invention relates generally to a television monitor control apparatus and, more particularly, is directed to a television monitor control apparatus suitable for use with a master monitor of, for example, a television broadcast station and the like.

2. Description of the Prior Art

Generally, in a television monitor control apparatus used in a television broadcast station, it is necessary that color gain and color hue be adjusted with high accuracy. In the prior art, when the color gain and the color hue are adjusted, they are adjusted manually by a skilled engineer while visually checking the display on the picture screen of a color bar signal. Further, in the prior art, white balance is controlled manually by a skilled engineer with reference to a subjective visual standard or by using a color analyzer. In either case, the adjustment procedure is cumbersome, and usually it takes at least 10 or more minutes to finish adjustment of the white balance of a single television monitor.

OBJECTS AND SUMMARY OF THE INVENTION

It is a general object of the present invention to provide an improved television monitor control apparatus for use at a broadcast station.

More specifically, it is an object of the present invention to provide a television monitor control apparatus having an automatic set up circuit.

Another object of the present invention is to provide a television monitor control apparatus in which reference signals for three primary color signals are stored previously.

More particularly, a further object of the present invention is to provide an automatic set up circuit in a television monitor control apparatus in which color hue, color gain and white balance are adjusted in accordance with previously stored reference signals.

Still a further object of the present invention is to provide an automatic set up circuit for a television monitor control apparatus in which, when the automatic set up circuit for adjusting color gain and color hue is operated, specific color components are extracted from a color bar signal obtained from a standard color bar generator, the levels of first and second signals representing the specific color components are compared and the color gain and the color hue are automatically adjusted in response to the resultant compared output signal.

According to another aspect of the present invention, a brightness on the face plate of a color cathode ray tube is detected and the resulting detected signal is compared with a reference signal stored previously in a memory, whereupon a white balance is adjusted in response to a resultant compared output signal, so that the white balance is controlled automatically. More particularly, red, green and blue colors are separately displayed in sequence on the display screen of a cathode ray tube, the brightnesses thereof are sequentially detected, the red, green and blue signals detected are compared with red, green and blue reference signals, respectively, stored in the memory and the compared red, green and blue output signals are used to control the white balance.

The above, and other objects, features and advantages of the present invention, will become apparent from the following detailed description of a preferred embodiment taken in conjunction with the accompanying drawings, in which the same reference numerals are used to designate like elements and parts in the several views.

DESCRIPTION OF THE PREFERRED EMBODIMENT

Figure 1:
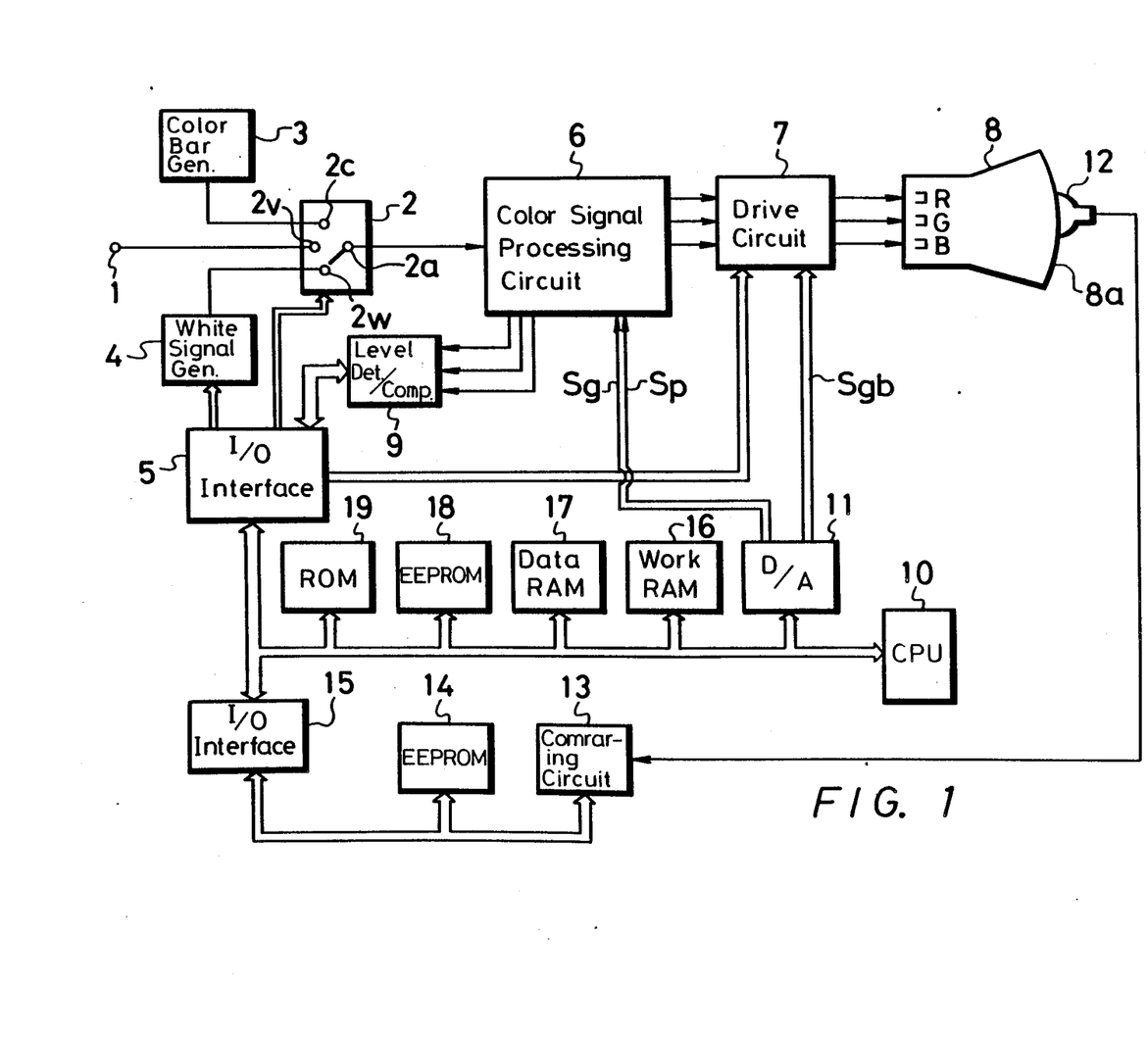
FIG. 1 is a block diagram showing an embodiment of a television monitor control apparatus according to this invention.

An embodiment of a television monitor control apparatus according to the present invention will now be described in detail with reference to FIG. 1, in which a video signal to be monitored is supplied from a video signal input terminal 1 to a first fixed contact 2v of a switch 2. A color bar signal generator 3 is provided to generate, for example, an SMPTE color bar signal which is supplied to a second fixed contact 2c of switch 2. A white signal generating circuit 4 is controlled by a control signal from an I/O interface 5, which will be further described later, so that circuit 4 selectively generates a high white signal, for example, of the level 100 IRE, and a low white signal, for example, of a level ranging from 10 to 20 IRE. Such selected output signal from white signal generating circuit 4 is supplied to a third fixed contact 2w of switch 2. A movable contact 2a of switch 2 is selectively engaged with first, second and third fixed contacts 2v,2c and 2w in response to a suitable control signal from the I/O interface 5.

The selected signal appearing at movable contact 2a of switch 2 is supplied through a color signal processing circuit 6 to a drive circuit 7, and red, green and blue signals appearing at respective outputs of drive circuit 7 are supplied to red, green and blue cathodes, respectively, of a color cathode ray tube 8.

In the illustrated embodiment, color bar signals from color signal processing circuit 6 are supplied to a level detecting/comparing circuit 9. In level detecting/comparing circuit 9, the level of only the blue color component of the color bar signals is detected. More specifically, when the color gain is being adjusted, a central processing unit (hereinafter simply referred to as CPU) 10 is operated via I/O interface 5 in such a manner that the level of the blue color component of the white portion W of the color bar signal (FIG. 9) coincides with the signal level of the blue color portion B and the gain of color signal processing circuit 6 is adjusted by a control signal $S_g$ from a D/A (digital-to-analog) converting circuit 11. When the color hue is adjusted, CPU 10 is operated via I/O interface 5 in such a manner that the level of the blue color component of the white portion W coincides with the level of the blue color component of the magenta portion M or the cyan portion CY of the color bar signal (FIG. 9) and the color hue is adjusted by the control signal $S_p$ from D/A converting circuit 11. Upon adjusting the white balance, drive circuit 7 switchably selects and supplies a single color signal of the red, green and blue color signals to color cathode ray tube 8 in response to a control signal from the I/O interface 5.

Figure 2:
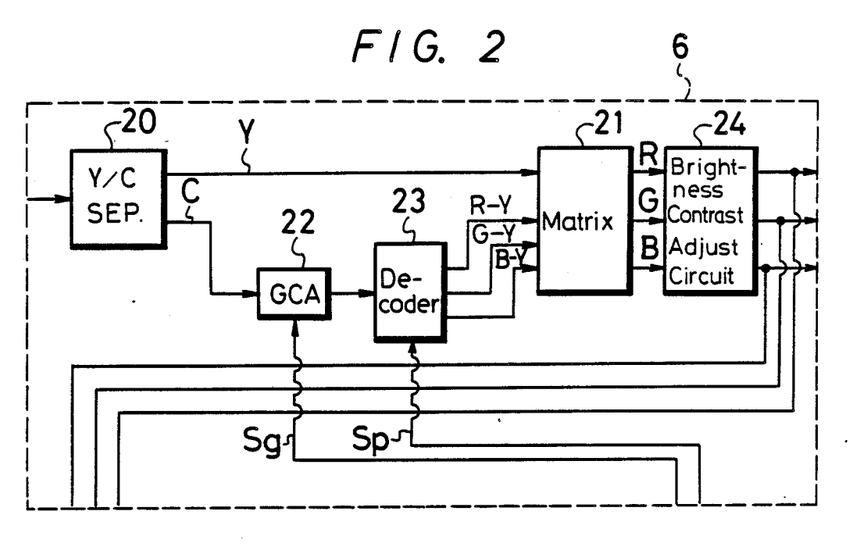
FIG. 2 is a block diagram showing one example of a practical circuit arrangement of a color signal processing circuit included in FIG. 1.

The color signal processing circuit 6 will now be described more fully with reference to FIG. 2, in which the output from switch 2 is shown supplied to a luminance/chrominance separator 20 and thereby separated into a luminance signal Y and a chrominance signal C. The luminance signal Y from from Y/C separator 20 is supplied to a matrix circuit 21, while the chrominance signal C is supplied through a gain control amplifier 22 to a decoder 23. Decoder 23 generates three color difference signals R-Y,G-Y and B-Y which are all supplied to matrix circuit 21 along with luminance signal Y. Three primary color signals R,G and B appearing at the output side of matrix circuit 21 are all supplied through a brightness and contrast adjusting circuit 24 to drive circuit 7. The outputs from brightness and contrast adjusting circuit 24 are also supplied to level detecting/comparing circuit 9 as the previously mentioned color bar signals. The gain control signal $S_g$ and the detecting phase or hue control signal $S_p$ are supplied to gain control amplifier 22 and decoder 23, respectively, from D/A converting circuit 11.

Turning back to FIG. 1, it will be seen that a brightness detecting apparatus 12 is detachably mounted on a video display screen 8a of color cathode ray tube 8. This brightness detecting apparatus 12 is constituted by, for example, a phototransistor. A brightness detecting signal appearing at the output of brightness detecting apparatus 12 is supplied to a comparing circuit 13. In this case, in comparing circuit 13, the brightness detecting signal from brightness detecting apparatus 12 is coverted to a digital signal and then this digital signal is compared with a suitable reference signal, as will be specifically described later. An EEPROM (product name which means an electrically erasable programmable read only memory) is employed as a memory 14. In EEPROM 14 there is stored a plurality (for example, three pairs) of reference signals constituting red, green and blue high and low reference signals, and from which it is possible to select a desirable white color. EEPROM 14, comparing circuit 13 and an I/O interface 15 are connected by a bus line through which a reference signal selected from EEPROM 14 is supplied to comparing circuit 13 and I/O interface 15.

CPU 10, D/A converting circuit 11, a work RAM (random access memory) 16, a data RAM 17, an EEPROM 18, a ROM (read only memory) 19 and I/O interface 15 are connected by a bus line through which a signal can be transferred from one to another of such components. In EEPROM 18, there are stored a plurality (for example, 3 kinds) of color temperature reference signals from which a desirable color temperature can be selected. Also, data corresponding to an earlier adjustment are stored in EEPROM 18. The color gain and color hue of gain control amplifier 22 (FIG. 2) and decoder 23 (FIG. 2), respectively, can be adjusted by output signals $S_g$ and $S_p$ from D/A converting circuit 11, and also the gain and bias of drive circuit 7 can be adjusted by an output signal $S_{gb}$ from D/A converting circuit 11.

Figure 3:
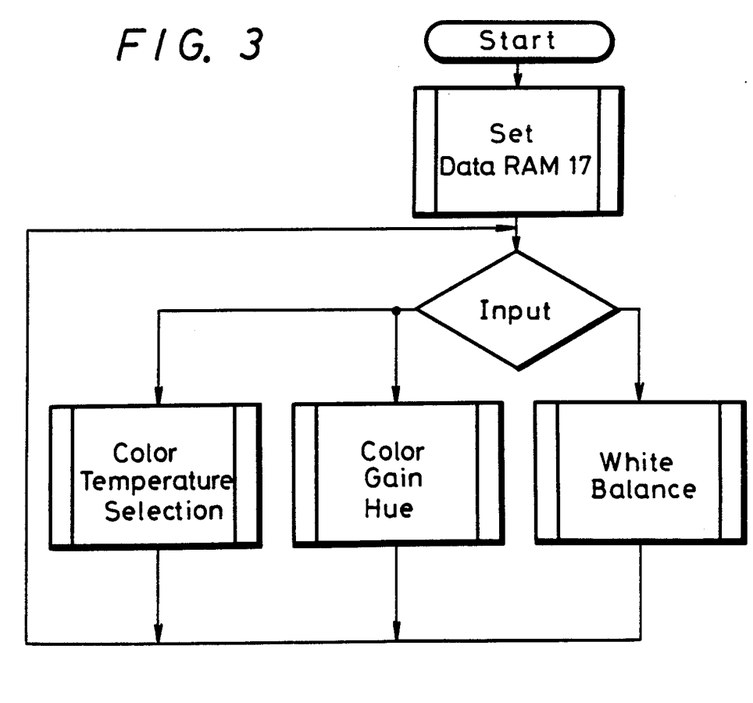
FIG. 3 is a general flow chart showing a program by which color gain and color hue are controlled in the apparatus shown in FIG. 1.

The above described television monitor control apparatus embodying the invention can perform an adjusting operation in accordance with the program shown in general on FIG. 3.

Figure 4:
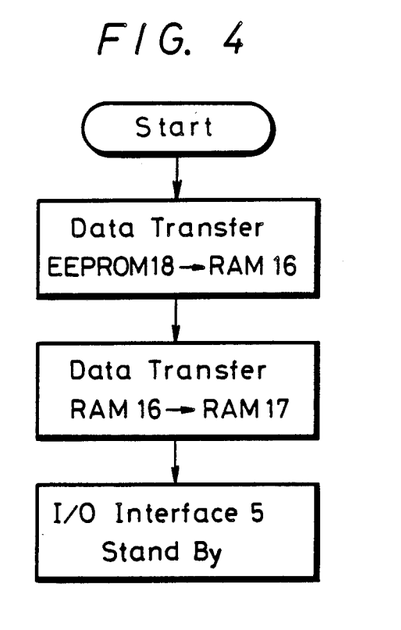
FIGS. 4,5,6 and 7 are respectively flow charts showing sub-routines of the program in FIG. 3.

Referring to FIG. 3, at the "start" of the adjustment program, data RAM 17 is initially set as shown on FIG. 4. More particularly, CPU 10 causes the data stored in EEPROM 18 to be transferred therefrom to work RAM 16 and then the data from work RAM 16 is transferred to data RAM 17. Thereafter, I/O interface 5 is set and placed in a standby mode for receiving an input.

Figure 5:
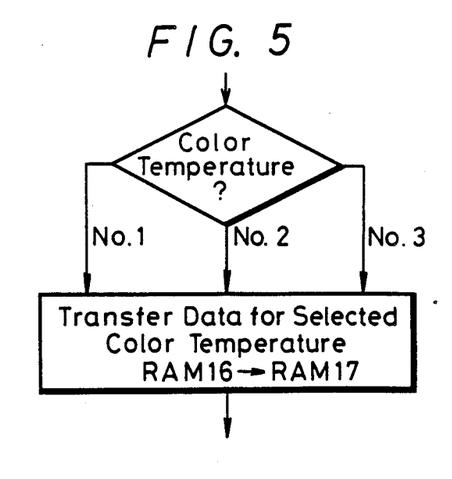

Then, as shown in FIG. 3, a desirable color temperature is selected for a particular broadcasting station. In the selection of the color temperature, as shown in FIG. 5, the operator of the broadcasting station selects the serial number of the desired color temperature data and data corresponding to the selected serial number is transferred from work RAM 16 to data RAM 17. Thereafter, I/O interface 6 is placed in the standby mode for receiving an input.

Figure 6:
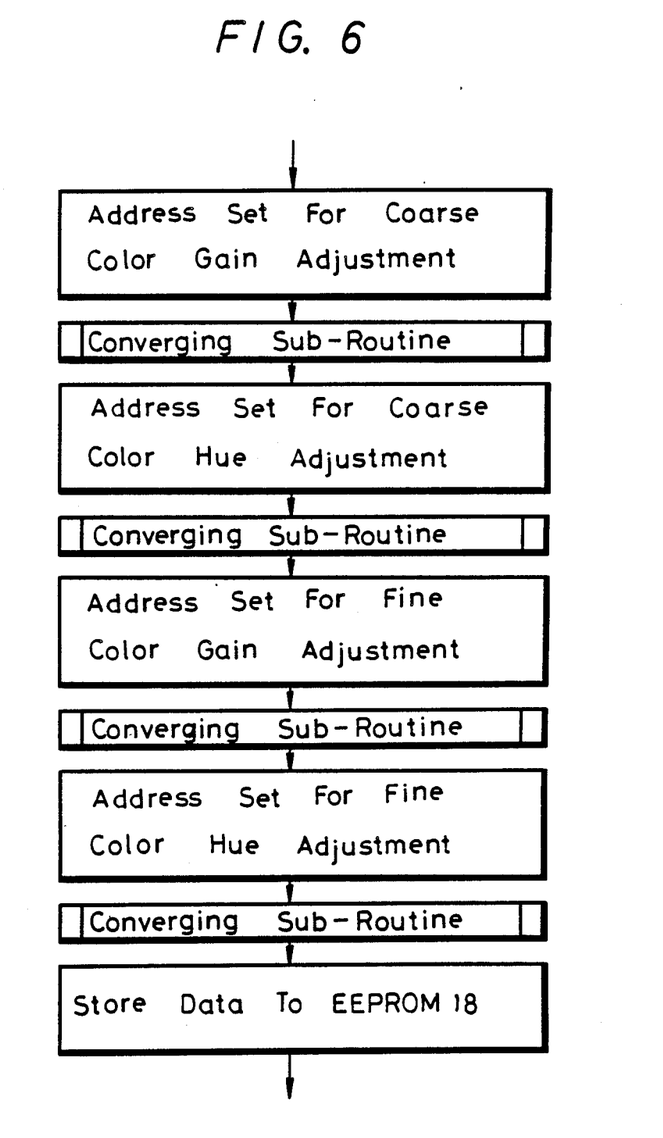
Figure 7:
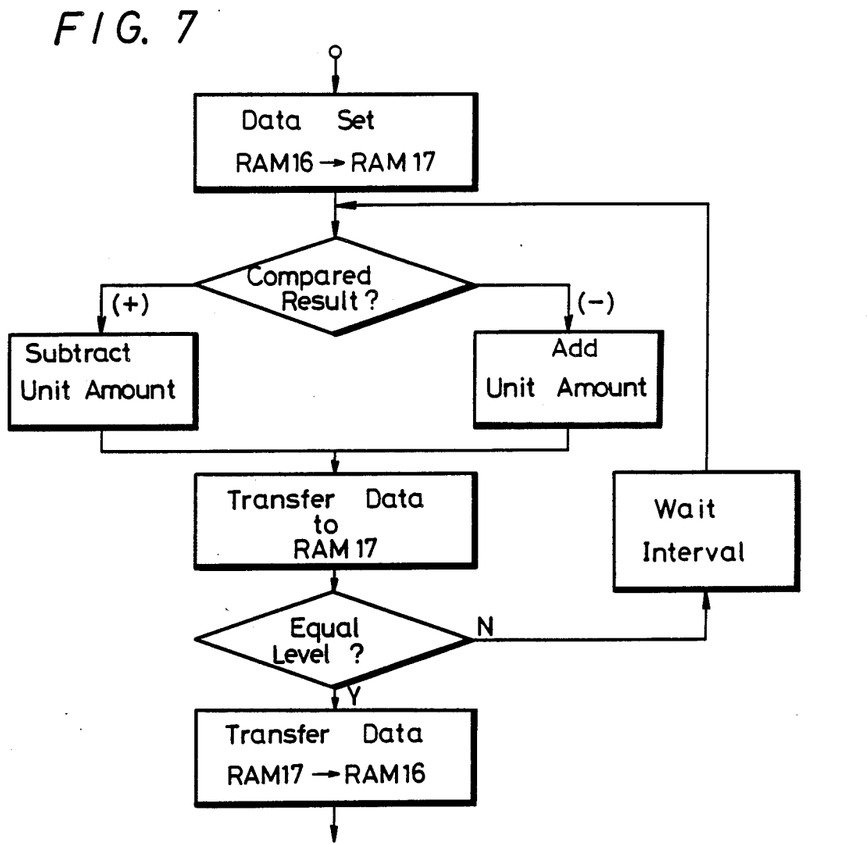
Figure 9:
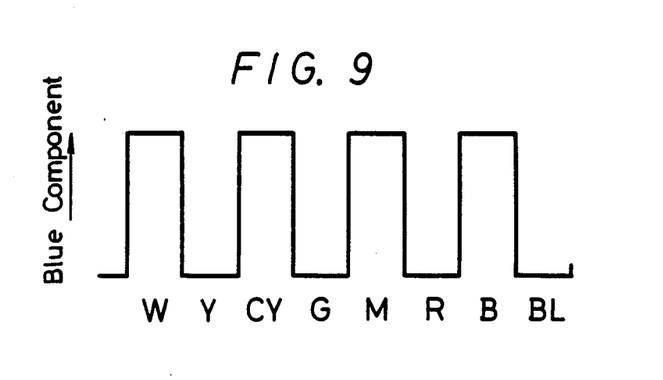
FIG. 9 is a schematic representation of a level of a blue color component of a color bar signal, and to which reference will be made in explaining the present invention.

Subsequently, the automatic color gain and color hue adjustments, that is, the so-called color and hue adjustments, will be carried out. In effecting the color gain and color hue adjustments, at first, movable contact 2a of switch 2 is engaged with second fixed contact 2c in response to a control signal from the I/O interface 5 and the color bar signal is supplied to color signal processing circuit 6. Then, level detecting/comparing circuit 9 is operated by a control signal from I/O interface 5 so that the level of the blue color component of the white portion W of the color bar signal (FIG. 9) and the signal level of the blue color portion B of the color bar signal are compared with each other. Further, as shown in FIG. 6, the addresses of work RAM 16 and data RAM 17 for coarse adjustment of the color gain are respectively specified by CPU 10 so as to carry out a predetermined operation. Thereafter, according to a converging sub-routine, coarse adjustment of the color gain is carried out. In such converging sub-routine, as shown in FIG. 7, at first, the data is read out of work RAM 16 to thereby set an initial value of data RAM 17. It will be appreciated that, if the adjustment data used last time is taken as the initial value, it is possible to reduce the time necessary for adjustment. Further, in the converging sub-routine, level detecting/comparing circuit 9 judges whether a value resulting from subtracting the signal level of the blue color portion B from the level of the blue color component of the white portion W of the color bar signal of FIG. 9 is positive or negative. If such difference value is positive (+), a unit amount is subtracted from the data at that time and the resultant data is transferred to data RAM 17, whereas, if the subtracted value is negative (−), a unit amount is added to the data at that time and the resultant data is transferred to data RAM 17. Then, the gain of color gain amplifier 22 is adjusted by the data from data RAM 17. After a predetermined time or "wait interval", the above described operations are repeated in sequence. When the level of the blue color component of the white portion W and the signal level of the blue color portion B coincide with each other, the data in data RAM 17 at that time is transferred to work RAM 16 and then the coarse adjustment of the color gain is ended.

Next, level detecting/comparing circuit 9 is operated by a control signal from the I/O interface 5 so that the level of the blue color component of the white portion W of the color bar signal shown in FIG. 9 is compared with the level of a blue color component of a cyan portion CY or a magenta portion M of that color bar signal. The addresses of the work RAM 16 and the data RAM 17 for carrying out the coarse adjustment of the color hue are specified, as shown on FIG. 6, and a predetermined operation, according to the sub-routine of FIG. 7, is performed for adjusting the color hue of decoder 23. When the level of the blue color component of the white portion W coincides with the level of the blue color component of the cyan portion CY or the magenta portion M, the data from data RAM 17, at that time, is transferred to work RAM 16 and thus the coarse adjustment of color hue is completed.

The fine adjustment of the color gain is carried out similarly to the above described coarse adjustment of the color gain. Further, after that, the fine adjustment of the color hue is carried out similarly to the coarse adjustment of the color hue. Thereafter, the data stored in EEPROM 18 is rewritten on the basis of the data from work RAM 16 and the color gain adjustment and the color hue adjustment are completed.

Figure 8:
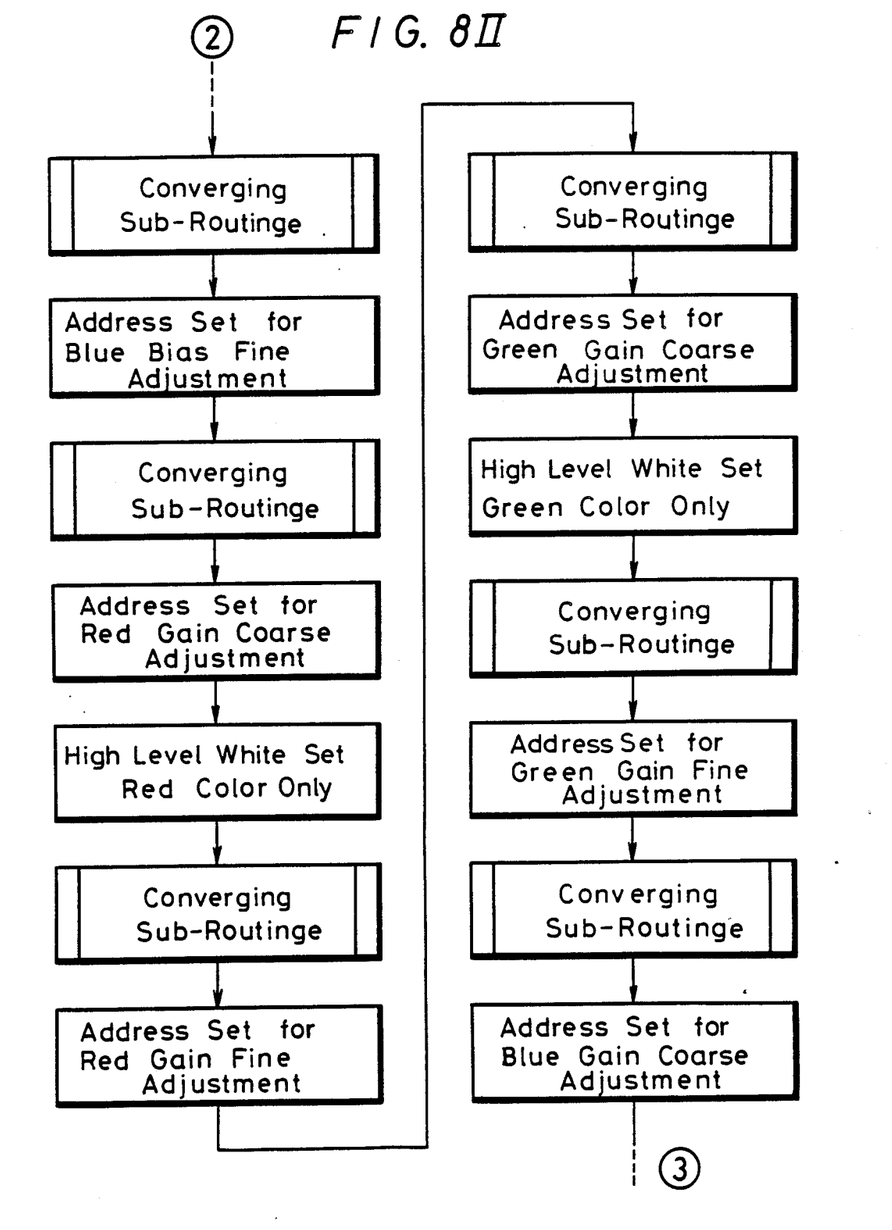
FIG. 8 (formed of FIGS. 8I,8II and 8III) is a detailed flow chart of an operation program for automatically adjusting the white balance in the program of FIG. 3.
Figure 8I:
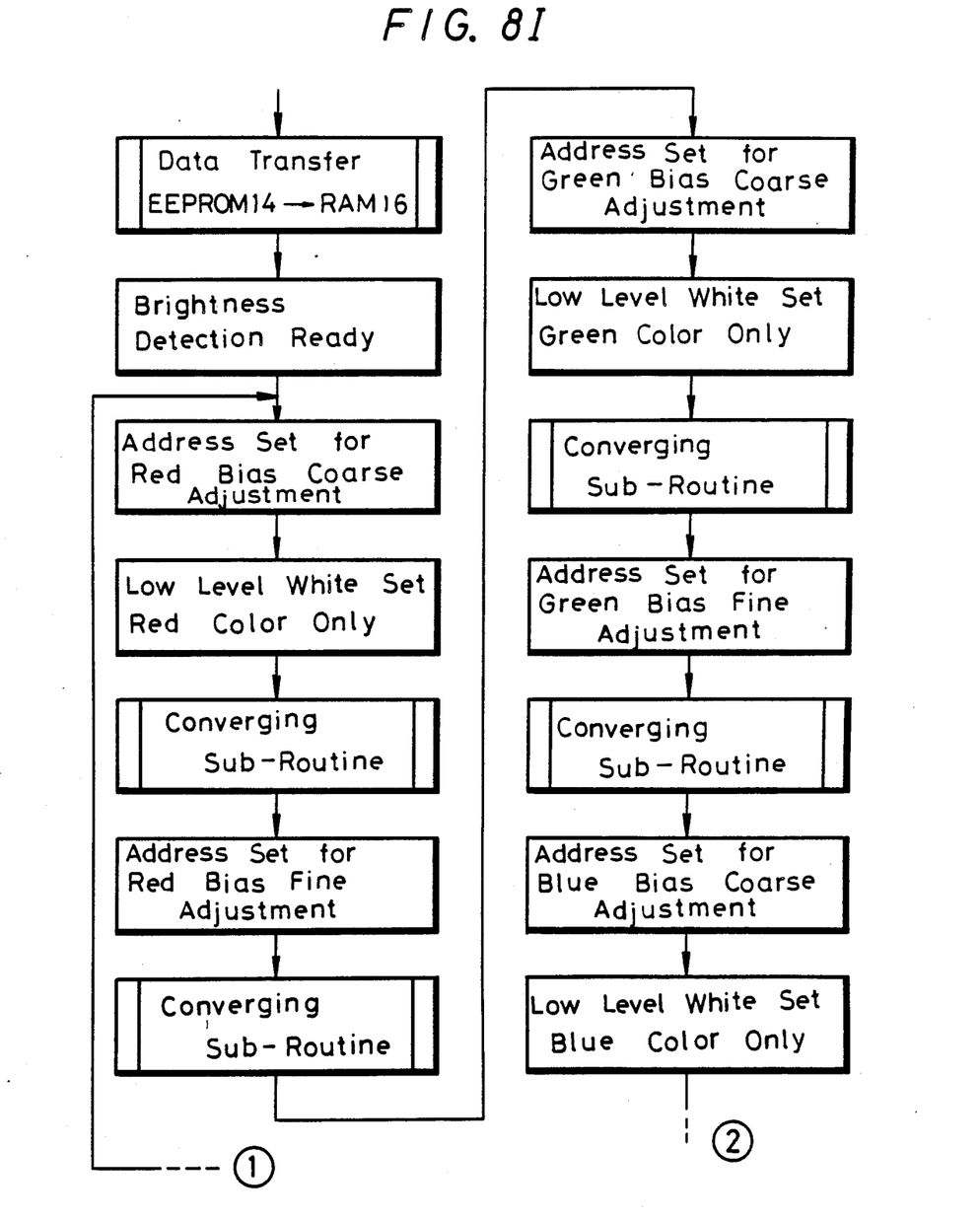

Subsequently, for automatically adjusting the white balance, movable contact 2a of switch 2 is engaged with fixed contact 2w in response to a control signal from I/O interface 5, whereby a high white signal having the level of 100 IRE, and a low white signal having the level of 20 IRE are alternately supplied from the white signal generating circuit 4 through color signal processing circuit 6 to drive circuit 7. At the commencement of this automatic white balance adjustment, as shown in FIG. 8, one of the plurality of reference signal sets stored in EEPROM 14 is selected and transferred to work RAM 16. The comparing signal for comparing circuit 13 is an output signal from brightness detecting apparatus 12 which detects the brightness of the video display screen 8a of color cathode ray tube 8. Next, the addresses of work RAM 16 and data RAM 17 for carrying out the coarse adjustment of the red color bias thereof are specified and, in response thereto, a predetermined operation is executed. Then, white signal generating circuit 4 is controlled by a control signal from I/O interface 5 so as to generate a low white signal having the level of, for example, 20 IRE, and also drive circuit 7 is similarly controlled so as to produce only the red color signal at its output side with the result that a red color is displayed on video display screen 8a of color cathode ray tube 8. The reference signal now applied from EEPROM 14 to comparing circuit 13 is designated a red color low reference signal and, in accordance therewith, the red color bias is roughly adjusted by means of the converging sub-routine shown in FIG. 7. Of course, in this use of the sub-routine of FIG. 7, the "compared result" is obtained from the comparing circuit 13 rather than from the comparing circuit 9 as in the earlier described use of the sub-routine of FIG. 7. Specifically, at first, the data is read out from work RAM 16 and the initial value of data RAM 17 is set. Once again, if the adjusting data used last time is used as the initial value, it is possible to reduce the time necessary for the adjustment. According to this convergence sub-routine, it is determined whether the value resulting from subtracting the level of the output signal of brightness detecting apparatus 12 from the level of the reference signal (this time, the red color reference signal) in comparing circuit 13 is positive or negative. If it is positive (+), a unit amount is subtracted from the data at that time and the resultant data is transferred to data RAM 17. If on the other hand, the resultant value is negative (−), a unit amount is added to the data at that time prior to its being transferred to data RAM 17. Then, the data from data RAM 17 is employed for adjusting via D/A converting circuit 11, the red color of drive circuit 7, and this sequence of operations is repeatedly executed until the level of the red color low reference signal and the level of the output signal from brightness detecting apparatus 12 become coincident with each other. Upon such coincidence, the data of data RAM 17 at that time is transferred to work RAM 16, and at that time, the coarse adjustment of the red color bias is completed.

Next, as shown in FIG. 8, the addresses of work RAM 16 and data RAM 17 for carrying out the fine adjustment of the red color bias are specified by CPU 10 and the fine adjustment of the red color bias is carried out in a way similar to that described above, that is, by the converging sub-routine of FIG. 7.

Then, as further shown in FIG. 8, the addresses of work RAM 16 and data RAM 17 for carrying out the coarse adjustments of the green color bias are specified and a corresponding operation is carried out. Also, a control signal from I/O interface 5 controls white signal generating circuit 4 so as to generate the low white signal of, for example, 20 IRE, and drive circuit 7 is controlled to generate at its output side only the green color signal. Hence, the green color is displayed on display screen 8a of color cathode ray tube 8. Then, the reference signal for comparing circuit 13 is specified as a green color low reference signal from EEPROM 14 and thereafter, the coarse adjustment of the green color bias is carried out according to the converging sub-routine shown in FIG. 7. The data is read out from work RAM 16 and the initial value in data RAM 17 is set. Once again, if the adjusting data used last time is used as the initial value, it is possible to reduce the time necessary for the adjustment. By means of the converging sub-routine of FIG. 7, it is judged whether a value resulting from subtracting the level of the output signal of brightness detecting apparatus 12 from the level of the reference signal (this time, the green color low reference signal) in comparing circuit 13 is positive or negative. If it is positive (+), a unit amount is subtracted from the data at that time and the resultant data is transferred to data RAM 17. If on the other hand, the subtracted value is negative (−), a unit amount is added to the data which is then transferred to data RAM 17. Then, the bias of the green color in drive circuit 7 is adjusted in response to the data from data RAM 17 via D/A converting circuit 11 and this sequence of operations is repeatedly executed. When the level of the green color low reference signal and the level of the output signal from brightness detecting apparatus 12 become coincident with each other, the data of data RAM 17 at that time is transferred to work RAM 16 and the coarse adjustment of the green color bias is completed.

Subsequently, as shown in FIG. 8, the addresses of work RAM 16 and data RAM 17 for carrying out the fine adjustments of the green color bias are specified and the fine adjustment of the green color bias is carried out similarly to the above described fine adjustment of the red color bias.

Then, as shown in FIG. 8, the addresses of work RAM 16 and data RAM 17 for carrying out the coarse adjustment of the blue color bias are specified. Further, by a control signal from the I/O interface 5, white signal generating circuit 4 is controlled so as to generate the low white signal of, for example, 20 IRE and also drive circuit 7 is controlled to generate, at its output side, only a blue color signal so that the blue color is displayed on display screen 8a of cathode ray tube 8. Further, at this time, the reference signal for comparing circuit 13 is specified as the blue color low reference signal and the coarse adjustment of the blue bias is carried out according to the converging sub-routine shown in FIG. 7. Specifically, data is read out from work RAM 16 and the initial value is set in data RAM 17. Once more, if the adjusting data used last time is used as the initial value, it is possible to reduce the time necessary for the adjustment. According to this converging sub-routine, it is judged whether a value resulting from subtracting the level of the output signal of brightness detecting apparatus 12 from a level of a reference signal (this time, the blue color low reference signal) in the comparing circuit 13 is positive or negative. If it is positive (+), a unit amount is subtracted from the data at that time and the resultant data is transferred to data RAM 17. On the other hand, if the resultant value in comparing circuit 13 is negative (−), a unit amount is added to the data and the resultant data are transferred to data RAM 17. Then, the bias of the blue color in drive circuit 7 is adjusted in response to the data from data RAM 17 via D/A converting circuit 11 and this sequence of operations is repeatedly executed. When the level of the blue color low reference signal and the level of the output signal from brightness detecting apparatus 12 become coincident, the data in data RAM 17 at that time is transferred to work RAM 16 and then the coarse adjustment of the blue color bias is completed.

Continuing with the program shown in FIG. 8, the respective addresses of work RAM 16 and data RAM 17 for carrying out the fine adjustments of the blue color bias are specified and the fine adjustment of the blue color bias is carried out similar to the above described fine adjustment of the red color bias.

Then, as shown in FIG. 8, the respective addresses of work RAM 16 and data RAM 17 for performing coarse adjustments of the red gain are specified, whereby to carry out a predetermined operation. Also, by a control signal from I/O interface 5, white signal generating circuit 4 is controlled so as to generate the high white signal having the level of, for example, 100 IRE, and also drive circuit 7 is controlled to generate at its output side only the red color signal. Thus, a red color is displayed on display screen 8a of color cathode ray tube 8. Further, the reference signal of comparing circuit 13 is now specified as the red color high reference signal, and the coarse adjustment of the red color gain is carried out in accordance with the converging sub-routine shown in FIG. 7. In other words, data is read out from work RAM 16 and the initial value is set in data RAM 17. If the adjusting data used last time is used as the initial value in RAM 17, it is possible to reduce the time necessary for the adjustment thereof. In this converging sub-routine, it is judged whether a value resulting from subtracting the level of the output signal of brightness detecting apparatus 12, when exposed to the red color displayed on display screen 8a, from the level of the red color high reference signal in comparing circuit 13 is positive or negative. If it is positive (+), a unit amount is subtracted from the data at that time, and the subtracted data is transferred to data RAM 17. If on the other hand, the result of the subtraction in comparing circuit 13 is negative (−), a unit amount is added to the data then in RAM 16 and the resultant data is transferred to data RAM 17. Then, the gain of the red color channel in drive circuit 7 is adjusted in response to the data from RAM 17 via D/A converting circuit 11 and this sequence of operations is repeatedly carried out. When the level of the red color high reference signal and the level of the output signal from brightness detecting apparatus 12 become coincident with each other, the data in data RAM 17 at that time is transferred to work RAM 16 and then the coarse adjustment of this red color gain is completed. Subsequently, as shown in FIG. 8, the addresses of work RAM 16 and data RAM 17 for carrying out the fine adjustment of the red color gain are specified and the fine adjustment of the red color gain is executed similarly to the manner described above.

Then, as shown in FIG. 8, the addresses of work RAM 16 and data RAM17 for carrying out coarse adjustment of the green color gain are specified, whereby a predetermined operation is carried out. Also, by a control signal from I/O interface 5, white signal generating circuit 4 is controlled so as to generate the high white signal having the level of, for example, 100 IRE, and drive circuit 7 is also controlled to generate at its output side only the green color signal so that the green color is displayed on display screen 8a of color cathode ray tube 8. The reference signal of comparing circuit 13 is at this time specified as the green color high reference signal, and thereafter the coarse adjustment of the green color gain is carried out according to the converging sub-routine shown in FIG. 7. In other words, data is read out from work RAM 16 and the initial value is set in data RAM 17. Here again, if the adjusting data used last time is used as the initial value, it is possible to reduce the time necessary for the adjustment. In this converging sub-routine, it is judged whether a value resulting from subtracting the level of the output signal of brightness detecting apparatus 12 in response to the green color displayed on display screen 8afrom the level of the green color high reference signal in comparing circuit 13 is positive or negative. If such resulting value is positive (+), a unit amount is subtracted from the data at that time and the resulting data is transferred to data RAM 17. If on the other hand, the value resulting from the subtraction in circuit 13 is negative (−), a unit amount is added to the data and the resultant data is transferred to data RAM 17. Then, the gain of the green color in drive circuit 7 is adjusted in response to the data in RAM 17 via the D/A converting circuit 11 and this sequence of operation, is repeatedly executed. When the level of the green color high reference signal and the level of the output signal from brightness detecting apparatus 12 become coincident with each other, the data in data RAM 17 at that time is transferred to work RAM 16 and the coarse adjustment of the green color gain is completed.

Subsequently, as shown in FIG. 8, the addresses of work RAM 16 and data RAM 17 are specified for carrying out the fine adjustment of the green color gain, and the fine adjustment of the green color gain is effected in a manner similar to that described above for the fine adjustment of the red color gain.

Next, as shown in FIG. 8, the addresses of work RAM 16 and data RAM 17 for carrying out the coarse adjustment of the blue color gain are specified, whereby a predetermined operation is carried out. Further, by a control signal from I/O interface 5, white signal generating circuit 4 is controlled so as to generate the high white signal having the level of, for example, 100 IRE, and also drive circuit 7 is controlled to generate at its output side only the blue color signal so that the blue color is displayed on phosphor screen 8a. At this time, the reference signal in comparing circuit 13 is specified as the blue color high reference signal and, thereafter, the coarse adjustment of the blue color gain is carried out according to the converging sub-routine shown in FIG. 7. More specifically, data is read out from work RAM 16 and the initial value is set in data RAM 17. In this case, if the adjusting data used last time is used as the initial value, it is possible to reduce the time necessary for the adjustment. In this converging sub-routine, it is judged whether a value resulting from subtracting the level of the output signal of brightness detecting apparatus 12 corresponding to the blue color displayed on display screen 8a from the level of the blue color high reference signal is positive or negative. If it is positive (+), a unit amount is subtracted from the data at that time and the resultant data is transferred to data RAM 17. If, on the other hand, the subtracted value is negative (−), a unit amount is added to the data at that time and the resultant data is transferred to data RAM 17. Then, by using the data in data RAM 17, the gain of the blue color in drive circuit 7 is adjusted via D/A converting circuit 11 and this sequence of operations is repeatedly executed. When the level of the blue color high reference signal and the level of the out:put signal from brightness detecting apparatus 12 become coincident with each other, the data in data RAM 17 at that time is transferred to work RAM 16 and the coarse adjustment of this blue color gain is completed.

Subsequently, as shown in FIG. 8, the addresses of work RAM 16 and data RAM 17 for carrying out the fine adjustment of the blue color gain are specified. Then, the fine adjustment of the blue color gain is carried out in a manner similar to that described above for the fine adjustment of the red color gain. When all adjustments of the red, green and blue colors are completed, the data stored in EEPROM 18 is rewritten in accordance with the data stored in work RAM 16.

Thereafter, if the color gain, the color hue and the white balance of a monitor television apparatus are controlled on the basis of the data stored in this EEPROM 18, it is possible to provide the monitor television apparatus with color gain, color hue and white balance which are adjusted with good accuracy. Further, since the adjustment is carried out automatically, such adjustment can be advantageously made with high accuracy and in a quite short time by even a relatively unskilled operator. Furthermore, according to this embodiment, since red color, green color and blue color are each displayed sequentially on the phosphor screen 8a of the color cathode ray tube 8 and the brightness of each color is detected while it alone is displayed, brightness detecting apparatus 12 and other parts of the apparatus according to the invention can be relatively simplified as compared with corresponding parts in an apparatus of the type in which a white color is analyzed into red, green and blue colors by a filter. Also, since it is not necessary, in the apparatus according to this invention, to consider the filter characteristic, the light-emission and spectrograph characteristics of the phosphor of the cathode ray tube, and the like, it is possible to carry out the adjustment more easily and with higher accuracy.

When a television monitor control apparatus according to an embodiment of the present invention is required to match the white balance of another television monitor as a standard, six kinds of data representing picture screens displaying red, green and blue colors of the low white signal and red, green and blue colors of the high white signal are sequentially detected by brightness detecting apparatus 12 from the other television monitor. These data are stored in EEPROM 14 and, then, such data stored in EEPROM 14 are used as the reference signals to carry out the above mentioned adjustments. Thereby, it is possible to adjust one television monitor, to correspond with the previously effected adjustment of another television monitor.

Although a single preferred embodiment of the invention has been described in detail with reference to the drawings, it will be apparent that the invention is not limited to that precise embodiment, and many modifications and variations could be effected therein by one skilled in the art without departing from the spirit or scope of the invention as defined by the appended claims.

What is claimed is:

1. Television monitor control apparatus comprising:
    color bar generator means that generates a color bar signal supplied as a standard television signal;
    signal processing means supplied with said color bar signal and including a color gain control amplifier, a color hue control circuit, and drive bias and drive gain control circuits; and
    signal control means connected to said signal processing means for adjusting the operation of said signal processing means;
    wherein said signal control means includes level detecting and comparing means, means operating said level detecting and comparing means to compare the level of a blue color portion of said color bar signal as processed by said signal processing means with the level of the blue component of a white portion of the processed color bar signal, means for adjusting the gain of said color gain control amplifier in response to an output of said level detecting and comparing means so as to achieve coincidence of the levels of the compared blue portion and blue component of the white portion of said processed color bar signal, means operating said level detecting and comparing means to compare the level of said blue component of the white portion of the processed color bar signal with the level of the blue component of a cyan or magenta portion of the processed color bar signal, and means for adjusting said color hue control circuit in response to an output of said level detecting and comparing means so as to achieve coincidence of the levels of the compared blue components of the white portion and of the cyan or magenta portion of the processed color bar signal.

2. Television monitor control apparatus comprising:
    white signal generator means that generates high level white and low level white signals each including three primary color signals;
    a color cathode ray tube supplied with a color signal;

a drive circuit for said color cathode ray tube;
reference signal memory means for storing at least one set of reference signals; and
signal control means connected to said reference signal memory means for adjusting the operation of said drive circuit;
wherein said signal control means includes brightness detecting means detecting a brightness of said color cathode ray tube, and means for controlling said drive circuit on the basis of a comparison of a signal from said reference signal memory means with a signal corresponding to the detected brightness of said tube.

3. Television monitor control apparatus as in claim 2; in which said reference signal memory means stores high and low level sets of red, green and blue color reference signals, said signal processing means is operative, during said adjusting of its white balance, to individually apply processed red, green and blue color signals in sequence to said color cathode ray tube so that said brightness detecting means detects only red, green and blue colors, respectively, displayed, in sequence, by said tube, and said red, green and blue color reference signals of the high and low level sets are selected for comparison with a detected output of said brightness detecting means when said signal processing means applies processed red, green and blue color signals in response to said high level and low level white signals, respectively.

* * * * *